United States Patent
Togashi et al.

(10) Patent No.: US 9,664,268 B2
(45) Date of Patent: May 30, 2017

(54) BALL SCREW DEVICE

(71) Applicant: THK CO., LTD., Tokyo (JP)

(72) Inventors: Tsutomu Togashi, Tokyo (JP); Hideo Saito, Tokyo (JP); Eri Kameda, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/112,843

(22) PCT Filed: Feb. 15, 2015

(86) PCT No.: PCT/JP2015/053498
§ 371 (c)(1),
(2) Date: Jul. 20, 2016

(87) PCT Pub. No.: WO2015/122380
PCT Pub. Date: Aug. 20, 2015

(65) Prior Publication Data
US 2016/0333995 A1 Nov. 17, 2016

(30) Foreign Application Priority Data

Feb. 13, 2014 (JP) ................................. 2014-025436

(51) Int. Cl.
*F16H 25/22* (2006.01)
(52) U.S. Cl.
CPC ..... *F16H 25/2223* (2013.01); *F16H 25/2204* (2013.01)
(58) Field of Classification Search
CPC .......................... F16H 25/2223; F16H 25/2204
See application file for complete search history.

(56) References Cited

U.S. PATENT DOCUMENTS 3,399,581 A * 9/1968 Valenti ................ F16H 25/2015
74/424.86
7,640,820 B1 * 1/2010 West .................... F16C 33/3706
384/43

(Continued)

FOREIGN PATENT DOCUMENTS

| CN | 1597246 | 3/2005 |
| JP | 2003-232427 A | 8/2003 |

(Continued)

OTHER PUBLICATIONS

Office Action dated Nov. 28, 2016, issued in counterpart Chinese Application No. 201580007063.2, with English translation. (10 pages).

(Continued)

*Primary Examiner* — David M Fenstermacher
(74) *Attorney, Agent, or Firm* — Westerman, Hattori, Daniels & Adrian, LLP

(57) ABSTRACT

A ball screw device includes a ball circulation part having a ball circulation path. The ball circulation part is formed by combining a first split body and a second split body. The first split body has a fixing section fixed to an outer surface of a nut member. The second split body has a pair of leg sections configured to scoop up balls moving along a ball load rolling path and return the balls to the ball load rolling path, a connecting section configured to connect the pair of leg sections and disposed between the first split body and the nut member, and a pair of shoulder sections facing side surfaces of the first split body in two directions so as to sandwich the first split body between the pair of shoulder sections.

11 Claims, 12 Drawing Sheets

(56) References Cited

U.S. PATENT DOCUMENTS

| | | | |
|---|---|---|---|
| 8,534,152 B2 | 9/2013 | Hsu et al. | |
| 9,003,911 B2* | 4/2015 | Miyazaki | F16H 25/2214 74/424.87 |
| 2003/0145670 A1* | 8/2003 | Fujita | F16C 33/3706 74/89.44 |
| 2006/0156844 A1 | 7/2006 | Yamashita et al. | |
| 2007/0006676 A1* | 1/2007 | Mizuhara | B62D 5/0448 74/424.86 |
| 2009/0107273 A1* | 4/2009 | Chen | F16H 25/2214 74/424.86 |
| 2010/0101349 A1* | 4/2010 | Kuo | F16H 25/2214 74/424.86 |
| 2010/0170359 A1* | 7/2010 | Chen | F16H 25/2214 74/424.83 |
| 2011/0048151 A1* | 3/2011 | Liu | F16H 25/2214 74/424.86 |
| 2012/0000306 A1* | 1/2012 | Chen | F16H 25/2214 74/424.86 |
| 2012/0017713 A1* | 1/2012 | Miyahara | F16H 25/2214 74/424.86 |
| 2012/0073397 A1* | 3/2012 | Kuo | F16H 25/2214 74/424.86 |
| 2012/0192668 A1 | 8/2012 | Hsu et al. | |
| 2013/0255420 A1* | 10/2013 | Miyazaki | F16H 25/2214 74/424.86 |
| 2014/0033847 A1* | 2/2014 | Chiu | F16H 57/0497 74/424.86 |

FOREIGN PATENT DOCUMENTS

| | | |
|---|---|---|
| JP | 2005-155720 A | 6/2005 |
| JP | 2005-180655 A | 7/2005 |
| JP | 2007-40397 A | 2/2007 |
| JP | 2009-97532 A | 5/2009 |
| JP | 4861395 B2 | 1/2012 |

OTHER PUBLICATIONS

International Search Report dated May 19, 2015, issued in counterpart international application No. PCT/JP2015/053498, with English translation(4 pages).

Notice of Allowance dated Sep. 1, 2015, issued in counterpart Japanese application No. 2014-025436, with English translation(6 pages).

* cited by examiner

BALL SCREW DEVICE

TECHNICAL FIELD

The present invention relates to a ball screw device.

Priority is claimed on Japanese Patent Application No. 2014-025436, filed Feb. 13, 2014, the content of which is incorporated herein by reference.

BACKGROUND ART

A ball screw device has a configuration in which a plurality of balls roll along a ball load rolling path, which is constituted by a spiral ball rolling groove formed in a screw shaft, and a ball load rolling groove, which is formed in a nut member, which are opposite to each other. The ball screw device has a ball circulation path configured to circulate the balls that terminate the rolling along the ball load rolling groove to the ball load rolling groove again, and according to a relative rotation between the screw shaft and the nut member, the balls endlessly circulate from the ball circulation path to the ball load rolling path.

In the following Patent Literature 1, a pipe type ball circulation part is disclosed as a ball circulation part that forms the ball circulation path. The ball circulation part is formed by combining a first split body and a second split body. A mating surface between the first split body and the second split body is formed along the ball circulation path, and the ball circulation part has a configuration that can be split into upper and lower portions in a height direction. The ball circulation part is positioned with respect to a nut member (a ball load rolling path) by inserting the second split body under a pipe into an attachment hole of the nut member and fixing the first split body over the pipe to the nut member so as to be covered from above.

CITATION LIST

Patent Literature

[Patent Literature 1]
  Japanese Patent No. 4861395

SUMMARY OF INVENTION

Technical Problem

In the technology of Patent Literature 1, the second split body is simply covered by only the first split body, a positioning restriction property is decreased, and thus, the first split body and the second split body may be deviated by a load from the balls. A pipe tip of the second split body inserted into the nut member is a portion configured to scoop up the balls from the ball load rolling path, and clogging of the balls may occur in some cases when intermittently receiving the loads from the balls, and the balls cannot be scooped up from the ball load rolling path well when a positioning restriction property is low.

The present invention provides a ball screw device capable of increasing a positioning restriction property with respect to a nut member of a rolling body circulation part that can be split.

Solution to Problem

According to a first aspect of the present invention, a ball screw device includes a screw shaft having a spiral rolling body rolling groove; a nut member having a rolling body load rolling groove opposite to the rolling body rolling groove and forming a rolling body load rolling path; a rolling body circulation part having a rolling body circulation path configured to connect one end and the other end of the rolling body load rolling path; and a rolling body configured to endlessly circulate along the rolling body load rolling path and the rolling body circulation path. The rolling body circulation part is formed by combining a first split body and a second split body. The first split body has a fixing section fixed to an outer surface of the nut member. The second split body has a pair of leg sections configured to scoop up the rolling body moving along the rolling body load rolling path and return the rolling body to the rolling body load rolling path, a connecting section configured to connect the pair of leg sections and disposed between the first split body and the nut member, and a pair of shoulder sections facing side surfaces of the first split body in two directions so as to sandwich the first split body between the pair of shoulder sections.

According to a second aspect of the present invention, in the ball screw device according to the first aspect, the pair of shoulder sections are formed to protrude at opposite sides of the pair of leg sections with respect to the connecting section.

According to a third aspect of the present invention, in the ball screw device according to the first or second aspect, the two directions are a first direction in which the rolling body circulation path extends and a second direction perpendicular to the first direction.

According to a fourth aspect of the present invention, in the ball screw device according to any one of the first to third aspects, the first split body has a pair of notch sections including side surfaces facing the pair of shoulder sections in the two directions.

According to a fifth aspect of the present invention, in the ball screw device according to the fourth aspect, the first split body has a pair of brim sections facing the outer surface in at least a portion of a region line-symmetrical with respect to a region in which the pair of notch sections are formed using the rolling body circulation path as an axis.

Advantageous Effects of Invention

The above-mentioned ball screw device can increase a positioning restriction property with respect to the nut member of the rolling body circulation part that can be split.

DESCRIPTION OF EMBODIMENT

Hereinafter, an embodiment of the present invention will be described with reference to the accompanying drawings.

Figure 1:
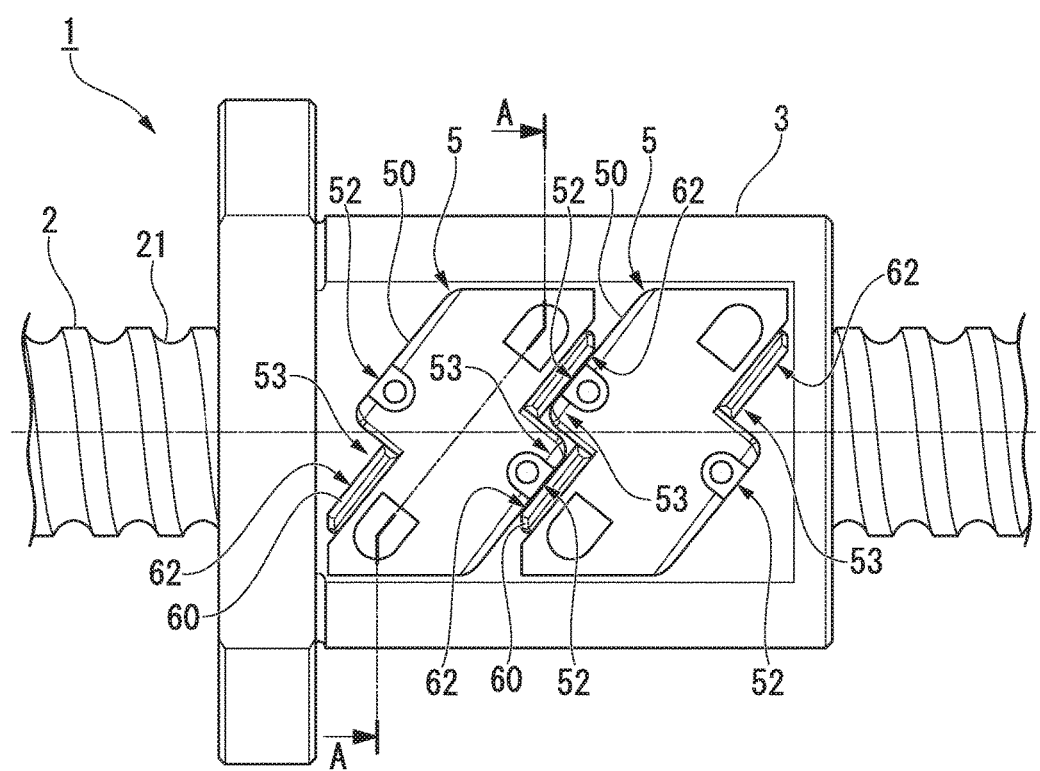
FIG. 1 is a plan view of a ball screw device according to an embodiment of the present invention.
Figure 2:
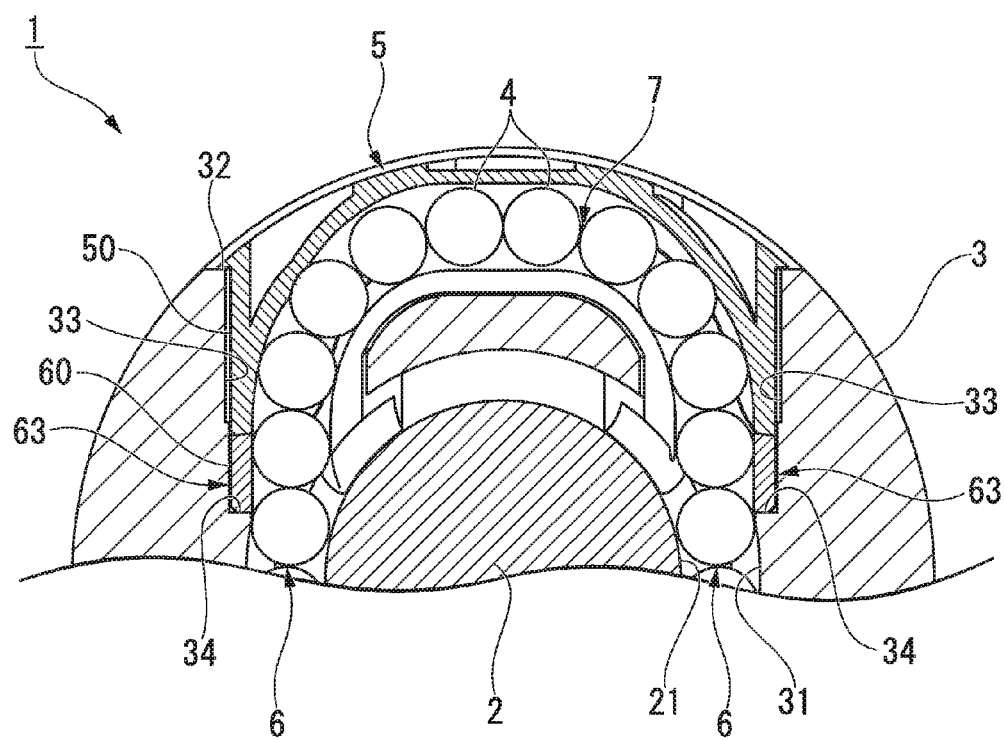
FIG. 2 is a cross-sectional view taken along line A-A of FIG. 1.

FIG. 1 is a plan view of a ball screw device 1 according to the embodiment of the present invention. FIG. 2 is a cross-sectional view taken along line A-A of FIG. 1.

As shown in FIGS. 1 and 2, the ball screw device 1 has a screw shaft 2, a nut member 3, balls 4 (rolling bodies) and a ball circulation part 5 (a rolling body circulation part). In the embodiment, as shown in FIG. 1, a plurality of (two) ball circulation parts 5 are attached to the nut member 3, and a plurality of (two) endless circulation paths of the balls 4 are formed.

Figure 3:
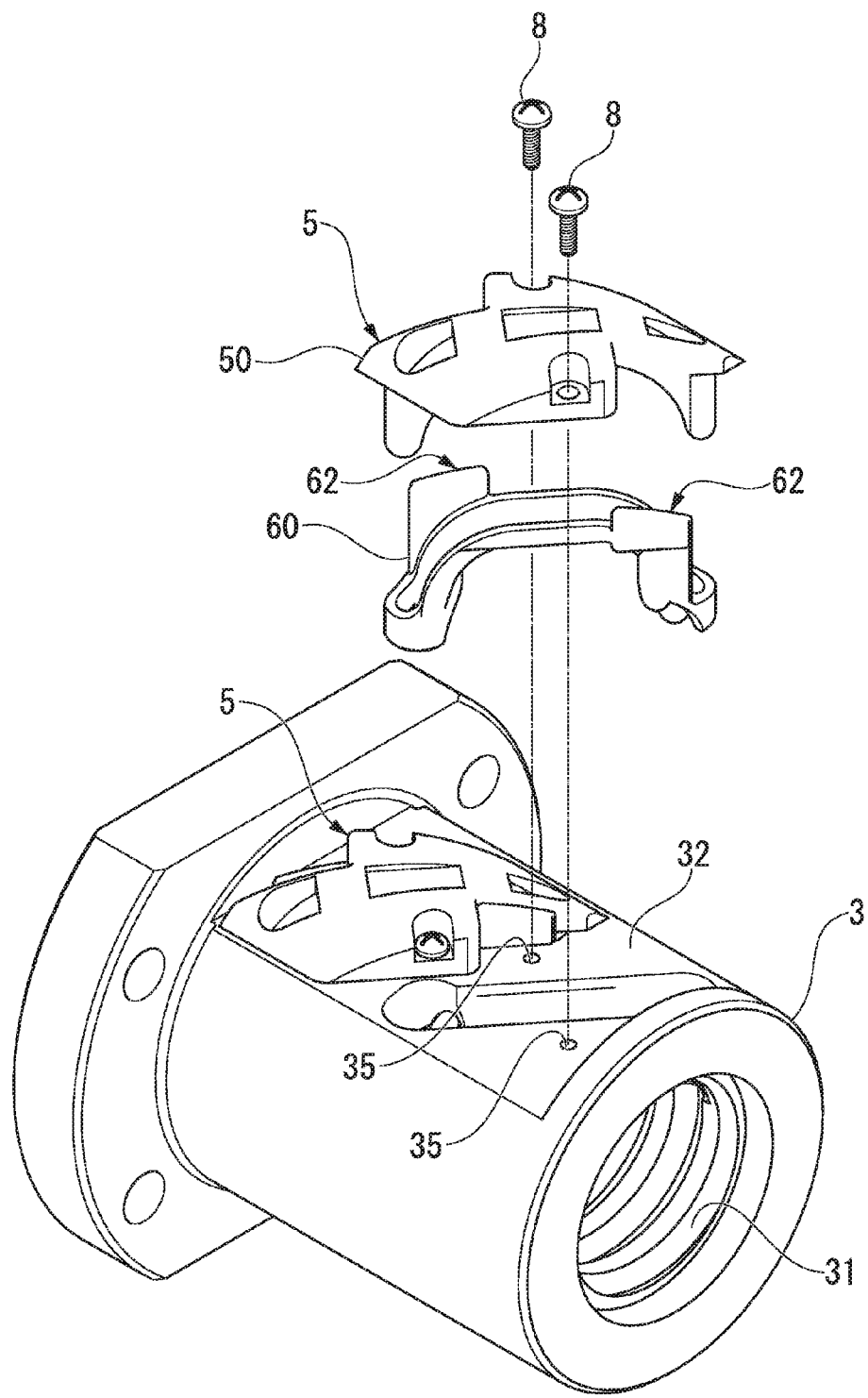
FIG. 3 is an exploded perspective view of the ball screw device according to the embodiment of the present invention.

As shown in FIG. 1, the screw shaft 2 has a spiral ball rolling groove 21 (a rolling body rolling groove) formed at an outer circumferential surface thereof. In addition, as shown in FIG. 2 and FIG. 3 (which will be described below), the nut member 3 has a spiral ball load rolling groove 31 (a rolling body load rolling groove) formed at an inner circumferential surface thereof. The ball load rolling groove 31 is formed in the same spiral shape as the ball rolling groove 21 of the screw shaft 2. When the screw shaft 2 is inserted into the nut member 3 and the ball rolling groove 21 and the ball load rolling groove 31 are opposite to each other, a ball load rolling path 6 is formed at opposite portions thereof. The balls 4 are disposed in the ball load rolling path 6, and the nut member 3 is supported by the screw shaft 2 in a state in which loads are applied to the balls 4.

As shown in FIG. 2, the ball circulation part 5 has a ball circulation path 7 (a rolling body circulation path) configured to connect one end (for example, a right side of FIG. 2) and the other end (for example, a left side of FIG. 2) of the ball load rolling path 6 (the rolling body load rolling path). An upstream side and a downstream side of the ball load rolling path 6 are interchanged according to a moving direction of the nut member 3. The ball circulation path 7 is formed in a substantially U shape. When both ends of the ball circulation path are inserted into the nut member 3, an endless circulation path of the balls 4 is formed to come in communication with the ball load rolling path 6. The ball circulation path 7 is formed to have a size such that a load is hardly applied to the balls 4 disposed therein.

Figure 4:
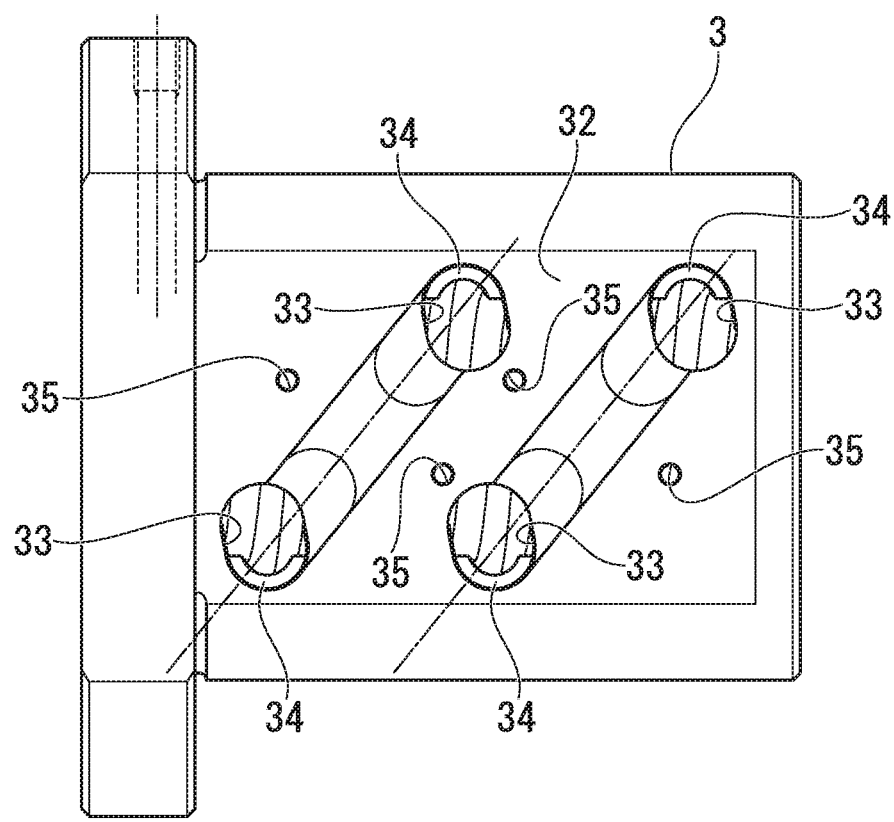
FIG. 4 is a plan view of a nut member according to the embodiment of the present invention.

FIG. 3 is an exploded perspective view of the ball screw device 1 according to the embodiment of the present invention. FIG. 4 is a plan view of the nut member 3 according to the embodiment of the present invention.

As shown in FIG. 3, the ball circulation part 5 is formed by vertically combining a first split body 50 and a second split body 60. The first split body 50 forms an upper side of the ball circulation path 7. In addition, the second split body 60 forms a lower side of the ball circulation path 7. The ball circulation part 5 of the embodiment is a resin molded product. The ball circulation part 5 is attached to an outer surface 32 of the nut member 3 formed of a metal via a bolt 8.

As shown in FIG. 4, the outer surface 32 is a rectangular flat surface formed at an outer circumference of the nut member 3. Attachment holes 33 of the ball circulation part 5 are formed in the outer surface 32 in a direction perpendicular to the flat surface. The attachment holes 33 are provided as a pair and pass through the nut member 3 to an inner circumferential surface thereof to come in communication with the ball load rolling groove 31. A support section 34 configured to support the inserted ball circulation part 5 is formed at an inner circumferential surface of the attachment hole 33. The support section 34 is formed in an arc shape when seen in a plan view, and disposed at an outer diameter side of the endless circulation path. A screw hole 35 configured to fix the ball circulation part 5 to the nut member 3 is formed in the outer surface 32.

Figure 5A:
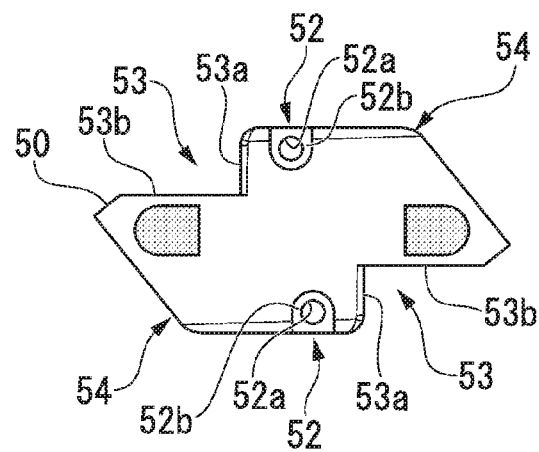
FIG. 5A is a plan view of a first split body according to the embodiment of the present invention.
Figure 5B:
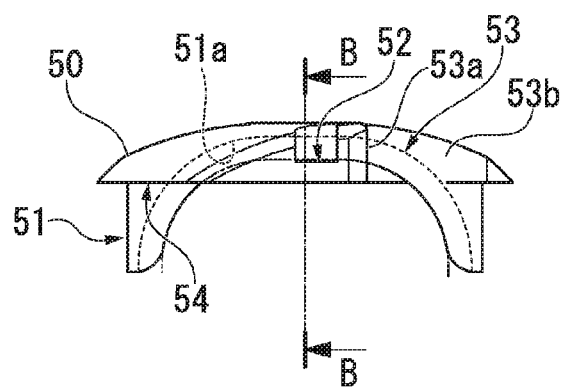
FIG. 5B is a front view of the first split body according to the embodiment of the present invention.
Figure 5C:
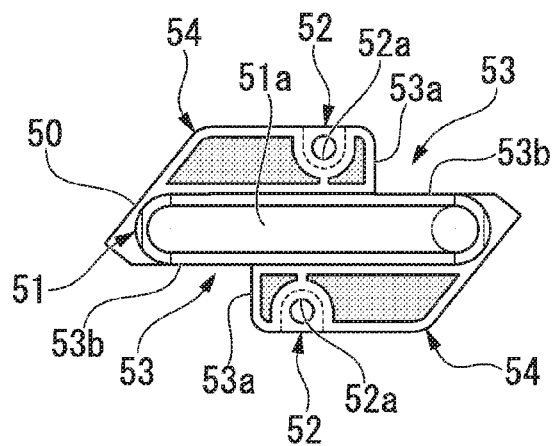
FIG. 5C is a bottom view of the first split body according to the embodiment of the present invention.
Figure 5D:
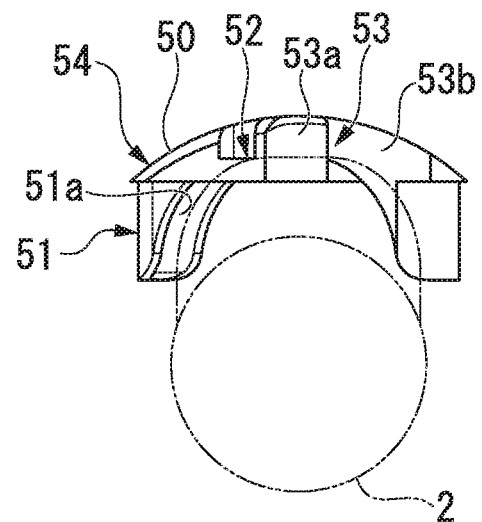
FIG. 5D is a view of the first split body when seen in an axial direction in which a screw shaft according to the embodiment of the present invention extends.
Figure 5E:
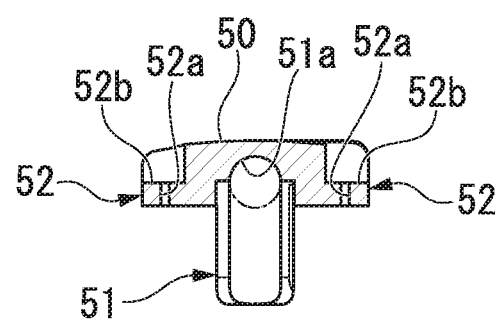
FIG. 5E is a cross-sectional view taken along line B-B of FIG. 5B.

FIGS. 5A, 5B, 5C, 5D and 5E are component views of the first split body 50 according to the embodiment of the present invention. FIG. 5A is a plan view of the first split body 50. FIG. 5B is a front view of the first split body 50. FIG. 5C is a bottom view of the first split body 50. FIG. 5D is a view showing the first split body 50 when seen in an axial direction in which the screw shaft 2 extends. FIG. 5E is a cross-sectional view taken along line B-B of FIG. 5B.

The first split body 50 has a half pipe section 51, a fixing section 52, a notch section 53 and a brim section 54. In FIGS. 5A, 5B, 5C, 5D and 5E, regions marked with dot patterns are concave places.

As shown in FIG. 5B, the half pipe section 51 is formed at a downward surface side of the first split body 50 (a side opposite to the nut member 3). The half pipe section 51 has a ball rolling groove 51a having a substantially U shape and that forms the upper side of the ball circulation path 7. As shown in FIG. 5E the ball rolling groove 51a has an arc shape when seen in a cross-sectional view. As shown in FIG. 5C, the half pipe section 51 is formed to extend in a longitudinal direction of the first split body 50. In addition, as shown in FIG. 5D, the half pipe section 51 is disposed to be inclined with respect to a direction in which the screw shaft 2 extends.

As shown in FIG. 5A, the fixing section 52 is formed at an upward surface side of the first split body 50 (a side not opposite to the nut member 3). The fixing section 52 is fixed to the outer surface 32 of the nut member 3 by the bolt 8. The fixing section 52 has an insertion hole 52a into which the bolt 8 is inserted, and a seat 52b configured to receive a head of the bolt 8. As shown in FIG. 5E, a pair of fixing sections 52 are provided at both sides of the half pipe section 51 with the half pipe section 51 sandwiched therebetween in a short-side direction of the half pipe section 51. As shown in FIG. 5C, the pair of fixing sections 52 are disposed to be slightly shifted point-symmetrical in the direction in which the half pipe section 51 extends.

As shown in FIG. 5A, the notch section 53 is formed at a side portion of the first split body 50.

The notch section 53 includes side surfaces 53a and 53b. As shown in FIG. 5C, the side surface 53a is a surface perpendicular to the direction in which the half pipe section 51 extends. In addition, the side surface 53b is a surface parallel to the direction in which the half pipe section 51 extends. The notch section 53 forms a right-angled recess in a side portion of the first split body 50 by the side surfaces 53a and 53b. A pair of notch sections 53 are provided at both sides of the half pipe section 51 with the half pipe section 51 sandwiched therebetween in the short-side direction of the half pipe section 51. As shown in FIG. 5C, the pair of notch sections 53 are disposed to be slightly shifted point-symmetrical in the direction in which the half pipe section 51 extends.

As shown in FIG. 5A, the brim section 54 is formed at the side portion of the first split body 50. The brim section 54 faces the outer surface 32 of the nut member 3. As shown in FIG. 5C, the brim section 54 is integrally formed with the fixing section 52. The brim section 54 extends from the fixing section 52 opposite to the notch section 53 in the direction in which the half pipe section 51 extends. A pair of brim sections 54 are formed at both sides with the half pipe section 51 sandwiched therebetween in the short-side direction. As shown in FIG. 5C, the pair of brim sections 54 are disposed to be slightly shifted point-symmetrical in the direction in which the half pipe section 51 extends.

Figure 6A:
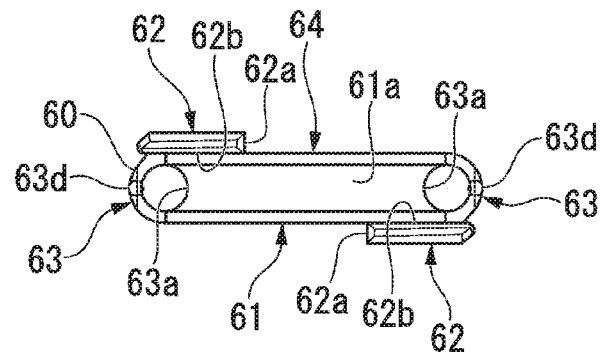
FIG. 6A is a plan view of a second split body according to the embodiment of the present invention.
Figure 6B:
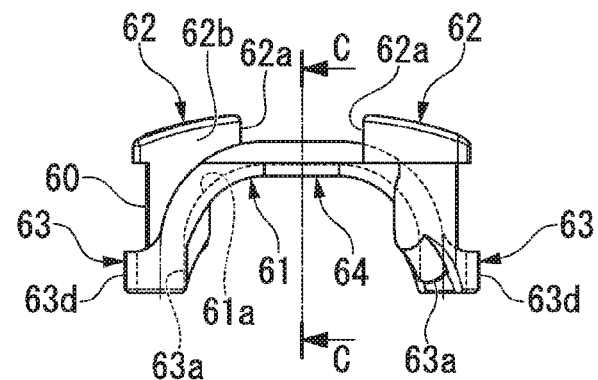
FIG. 6B is a front view of the second split body according to the embodiment of the present invention.
Figure 6C:
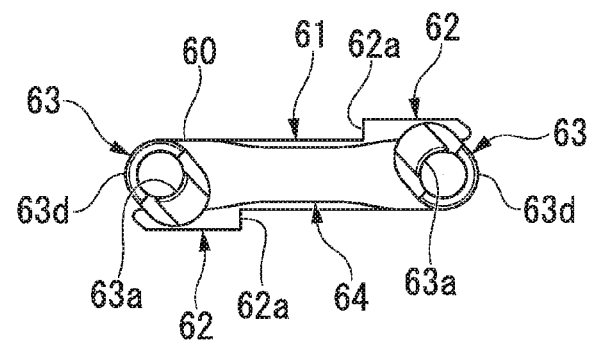
FIG. 6C is a bottom view of the second split body according to the embodiment of the present invention.
Figure 6D:
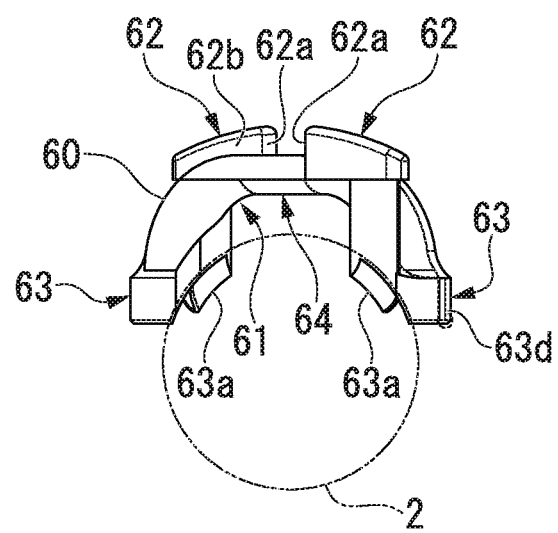
FIG. 6D is a view of the second split body when seen in the axial direction in which the screw shaft according to the embodiment of the present invention extends.
Figure 6E:
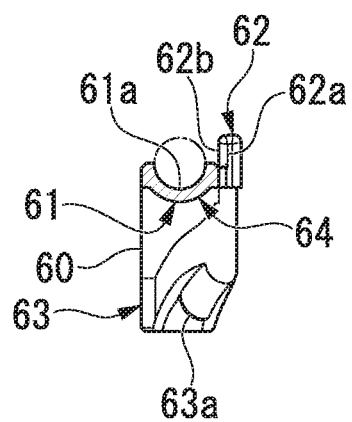
FIG. 6E is a cross-sectional view taken along line C-C of FIG. 6B.

FIGS. 6A, 6B, 6C, 6D and 6E are component views of the second split body 60 according to the embodiment of the present invention. FIG. 6A is a plan view of the second split body 60. FIG. 6B is a front view of the second split body 60. FIG. 6C is a bottom view of the second split body 60. FIG. 6D is a view showing the second split body 60 when seen in the axial direction in which the screw shaft 2 extends. FIG. 6E is a cross-sectional view taken along ling C-C of FIG. 6B.

The second split body 60 has a half pipe section 61 and a shoulder section 62.

As shown in FIG. 6B, the half pipe section 61 has a ball rolling groove 61a having a substantially U shape and that forms a lower side of the ball circulation path 7. As shown in FIG. 6E, the ball rolling groove 61a has an arc shape when seen in a cross-sectional view. As shown in FIG. 6A, the half pipe section 61 is formed to extend in a longitudinal direction of the second split body 60. In addition, as shown in FIG. 6D, the half pipe section 61 is disposed to be inclined with respect to the direction in which the screw shaft 2 extends. The half pipe section 61 has a leg section 63 and a connecting section 64.

As shown in FIG. 6B, a pair of leg sections 63 are formed at both end portions of the half pipe section 61. The connecting section 64 connects between the pair of leg sections 63. As shown in FIG. 2, the pair of leg sections 63 are inserted into the attachment holes 33 of the nut member 3 and supported by the support sections 34.

The pair of leg sections 63 is a member configured to scoop up the balls 4 moving along the ball load rolling path 6 and return the balls 4 to the ball load rolling path 6. As shown in FIG. 6C, a scooping section 63a configured to scoop up the balls 4 is formed at the leg section 63.

Figure 7:
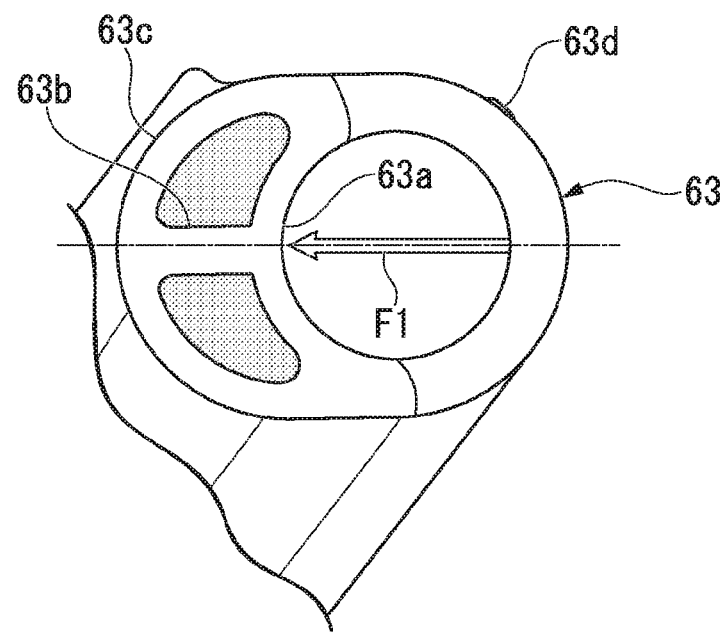
FIG. 7 is an enlarged view of a leg section according to the embodiment of the present invention.

FIG. 7 is an enlarged view of the leg section 63 according to the embodiment of the present invention. In FIG. 7, regions marked with dot patterns are concave places (not shown in the other drawings).

As shown in FIG. 7, the leg section 63 has a shape in which a thickness of the scooping section 63a side is increased.

Since the scooping section 63a is a portion configured to scoop up the balls 4 from the ball load rolling path 6 and intermittently receives a load from the balls 4, strength is secured by increasing the thickness thereof. However, when the leg section 63 is formed by resin molding, a sink mark is likely to be generated in a portion at which the thickness is increased. For this reason, the leg section 63 has a beam section 63b and an outer circumferential section 63c.

The beam section 63b is a member configured to support a rear surface side of the scooping section 63a. The beam section 63b extends in a direction shown by an arrow F1. The direction shown by the arrow F1 is a direction in which a collision load of the balls 4 is applied to the scooping section 63a. The outer circumferential section 63c is an outer wall section of the leg section 63, and a cross-sectional contour of the leg section 63 is formed in an elliptical shape or a bale shape to increase a second moment of area with respect to bending. According to the configuration, strength of the leg section 63 can be increased while preventing occurrence of the sink mark using the region marked with the dot patterns shown in FIG. 7 as thinning places. The beam section 63b may have a truss structure.

In addition, a protruding section 63d protruding outward from the outer circumferential section 63c is formed at the leg section 63.

Figure 8A:
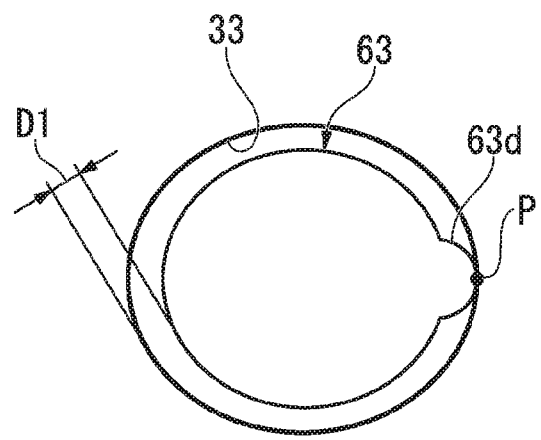
FIG. 8A is a schematic view showing a case in which a protruding section is provided at the leg section with respect to an attachment hole according to the embodiment of the present invention.
Figure 8B:
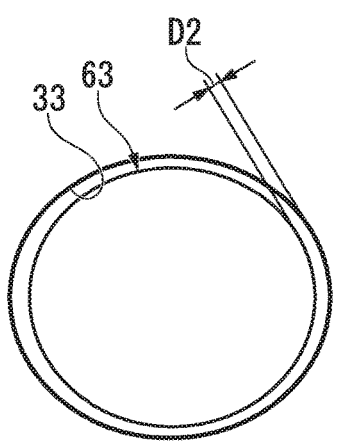
FIG. 8B is a schematic view showing a case in which the protruding section is not provided at the leg section with respect to the attachment hole according to the embodiment of the present invention.

FIGS. 8A and 8B are schematic views showing disposition of the leg section 63 with respect to the attachment hole 33 according to the embodiment of the present invention. FIG. 8A shows a case in which the protruding section 63d is provided at the leg section 63. FIG. 8B is a case in which the protruding section 63d is not provided at the leg section 63.

As shown in FIG. 8A, the protruding section 63d has an arc shape protruding outward from the leg section 63. The protruding section 63d is formed to extend in an insertion direction of the attachment hole 33 (a direction perpendicular to the drawing of FIG. 8A). In addition, a pair of protruding sections 63d are formed at both end portions in the longitudinal direction of the second split body 60 (see FIG. 6B).

As shown in FIG. 8A, as the protruding section 63d is formed at the leg section 63 to come in line contact with a position designated by reference character P, the leg section 63 is easily inserted into the attachment hole 33. Accordingly, deformation in resin molding of the second split body 60 can also be allowed to some extent. In addition, as the protruding section 63d is formed at the leg section 63, positioning of the leg section 63 with respect to the attachment hole 33 is easily performed. That is, when the protruding section 63d is not provided at the leg section 63, as shown in FIG. 8B, a clearance D2 between the leg section 63 and the attachment hole 33 at both sides of the leg section 63 should be managed to a small extent in order to provide positional precision. However, when the protruding section 63d is provided at the leg section 63, as shown in FIG. 8A, a clearance D1 between the leg section 63 and the attachment hole 33 at one side of the leg section 63 may be managed, and positioning is easily performed even when the clearance D1 is large.

As shown in FIG. 6A, the shoulder sections 62 are formed at the side portions of the second split body 60. As shown in FIG. 6B, the shoulder sections 62 are formed to protrude at opposite sides of the pair of leg sections 63 with respect to the connecting section 64. The shoulder sections 62 face in two directions with respect to the side surfaces 53a and 53b of the notch section 53 of the first split body 50. As shown in FIG. 6A, each of the shoulder sections 62 is formed in a flat plate shape having a side surface 62a that faces the side surface 53a, and a side surface 62b that faces the side surface 53b. A pair of shoulder sections 62 are formed at both sides of the half pipe section 61 with the half pipe section 61 sandwiched therebetween in the short-side direction of the half pipe section 61. As shown in FIG. 6A, the pair of shoulder sections 62 are disposed to be shifted point-symmetrical in the direction in which the half pipe section 61 extends.

Figure 9:
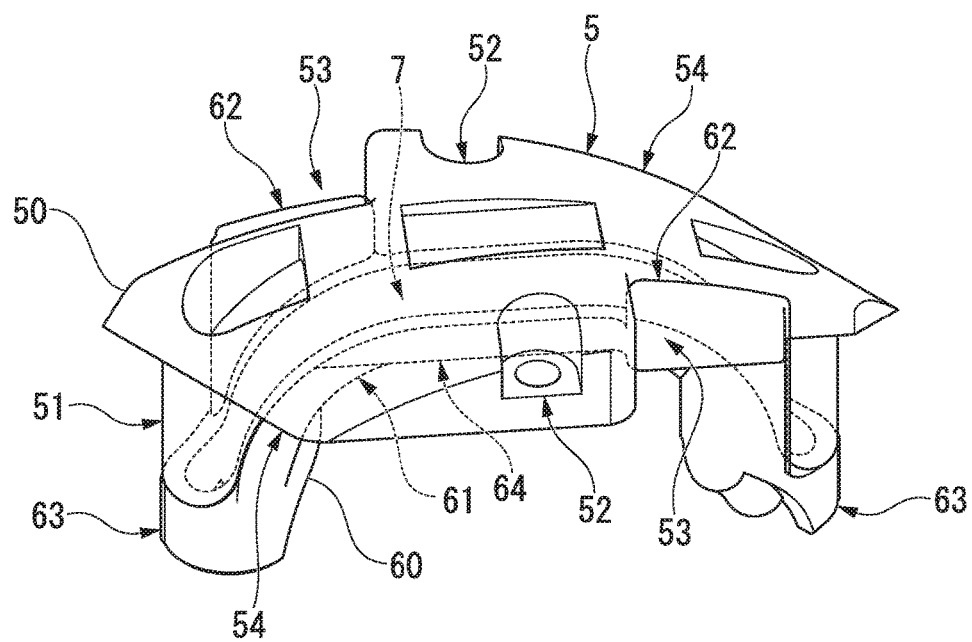
FIG. 9 is a perspective view of a ball circulation part according to the embodiment of the present invention.
Figure 10:
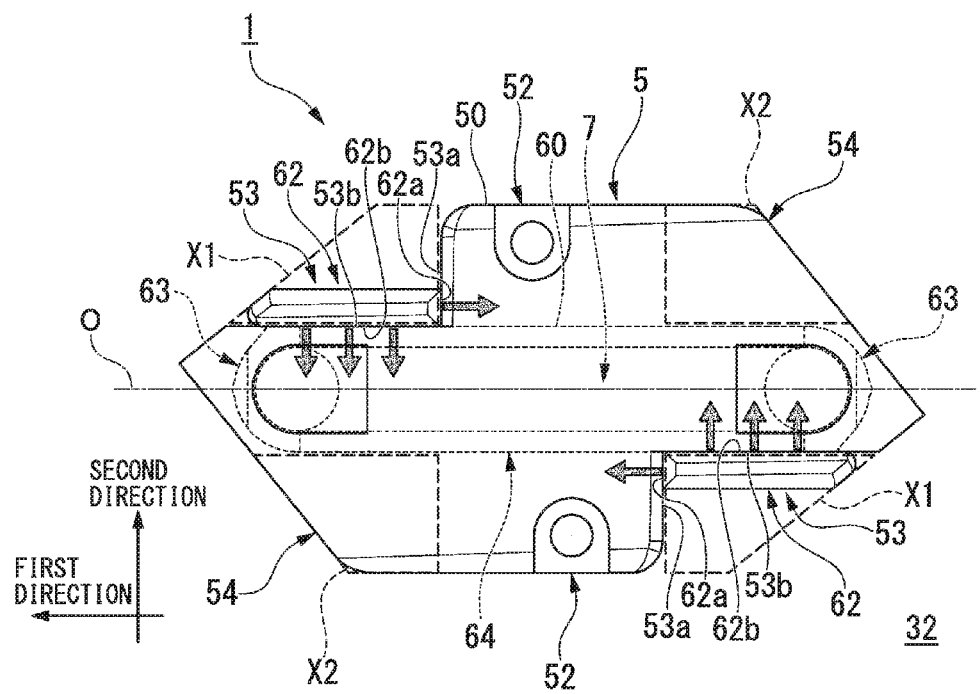
FIG. 10 is a plan view of the ball circulation part according to the embodiment of the present invention.

FIG. 9 is a perspective view of the ball circulation part 5 according to the embodiment of the present invention. FIG. 10 is a plan view of the ball circulation part 5 according to the embodiment of the present invention.

The first split body 50 and the second split body 60 having the above-mentioned configurations are combined as shown in FIGS. 9 and 10 to form the ball circulation part 5 having the ball circulation path 7. As shown in FIG. 10, the ball circulation part 5 is formed by vertically combining the first split body 50 to be sandwiched by the pair of shoulder sections 62 of the second split body 60.

The pair of shoulder sections 62 face in the two directions with respect to the side surfaces 53a and 53b of the first split body 50.

As shown in FIG. 10, the two directions are a first direction and a second direction along the outer surface 32 to which the fixing section 52 of the first split body 50 is fixed. According to the above-mentioned configuration, since relative movement between the first split body 50 and the second split body 60 in the two directions along the outer surface 32 is limited by the pair of shoulder sections 62, the first split body 50 and the second split body 60 can be restricted in a planar direction. In addition, in the second split body 60, the connecting section 64 is disposed between the first split body 50 and the nut member 3, and the leg section 63 is inserted between the first split body 50 and the nut member 3. For this reason, the second split body 60 can be restricted not only in the planar direction along the outer surface 32 but also in a perpendicular direction perpendicular to the outer surface 32. In this way, according to the embodiment, a positioning restriction property between the first split body 50 and the second split body 60 can be increased, and deviation between the first split body 50 and the second split body can be prevented.

In addition, the two directions in which the pair of shoulder sections 62 face each other are the first direction in which the ball circulation path 7 extends and the second direction perpendicular to the first direction. The first direction is a direction in which the balls 4 circulate and a direction in which collision loads are applied when the balls 4 are scooped up. The second direction is a widthwise direction of the ball circulation path 7 and left and right amplitude directions of the ball circulation path 7. According to the above-mentioned configuration, in the direction in which the collision load of the balls 4 is applied and the amplitude directions of the ball circulation path 7, the positioning restriction property between the first split body 50 and the second split body 60 can be increased. For this reason, deviation between the first split body 50 and the second split body 60 can be reliably prevented.

In addition, in the embodiment, the pair of shoulder sections 62 are provided at an interval to interference-fit the first split body 50 in the first direction and intermediately fit the second split body 60 in the second direction. According to the above-mentioned configuration, in the first direction in which the collision load of the balls 4 having a large load is applied, since the positioning restriction property between the first split body 50 and the second split body 60 can be increased, deviation between the first split body 50 and the second split body 60 can be reliably prevented. In addition, since the first direction is a direction in which the pair of leg sections 63 are easily opened through resin molding and the pair of shoulder sections 62 are relatively easily tightened, interference-fitting can be easily performed. Further, in the second direction having a relatively small load, the positioning restriction property is secured by obtaining large opposite areas of the shoulder sections 62, and assemblability between the first split body 50 and the second split body 60 is increased.

In addition, since the pair of shoulder sections 62 are formed to protrude at opposite sides of the pair of leg sections 63 with respect to the connecting section 64, when the pair of shoulder sections 62 are gripped as shown in FIG. 3, the leg sections 63 can be easily inserted into the attachment hole 33 of the nut member 3, and assemblability can be further increased.

In addition, in the embodiment, the first split body 50 has the pair of notch sections 53 including the side surfaces 53a and 53b facing the pair of shoulder sections 62 in the two directions. According to the configuration, as shown in FIG. 1, a plurality of ball circulation parts 5 are disposed in parallel adjacent to each other.

Further, in the embodiment, as shown in FIG. 10, the first split body 50 has the pair of brim sections 54 facing the outer surface 32 in at least a portion of a region X2 line-symmetrical to a region X1 in which the pair of notch sections 53 are formed using the ball circulation path 7 as an axis O. According to the configuration, a pull-off strength of the ball circulation part 5 can be improved. Hereinafter, an action thereof will be described with reference to FIGS. 11, 12A and 12B.

Figure 11:
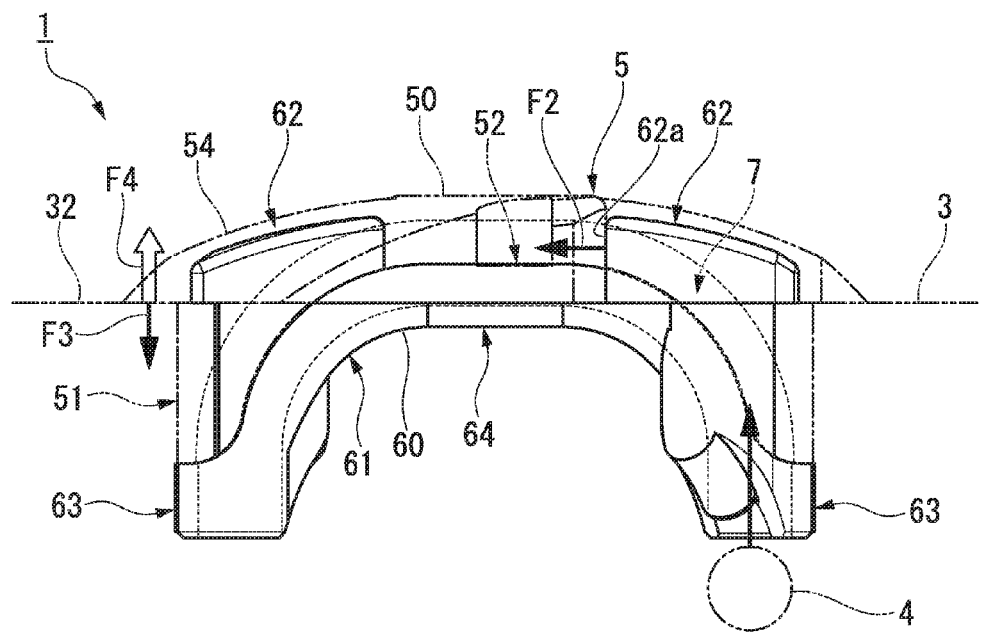
FIG. 11 is a view for describing an action by a brim section of the ball circulation part according to the embodiment of the present invention.

FIG. 11 is a view for describing an action of the brim section 54 of the ball circulation part 5 according to the embodiment of the present invention. In FIG. 11, the first split body 50 is shown by two-dot chain lines for the purpose of visibility.

As shown in FIG. 11, when the balls 4 enter the ball circulation part 5, a pull-off load is applied such that the ball circulation part 5 is raised with respect to the outer surface 32 of the nut member 3.

The pull-off load is converted into torque using the fixing section 52 as a fulcrum by the first split body 50 being fixed to the outer surface 32, as shown in FIG. 11, and the load is applied to the first split body 50 from the side surface 62a of the shoulder section 62 (shown by an arrow F2). The load is converted into torque using the fixing section 52 as a fulcrum as well, and the load is applied to the outer surface 32 from the brim section 54 (shown by an arrow F3).

The load is offset by a repulsive force from the outer surface 32 (shown by an arrow F4). In this way, as the brim section 54 is provided, a large area opposite to the outer surface 32 is secured, the collision load of the balls 4 is relieved, and thus, the pull-off strength of the ball circulation part 5 can be improved.

Figure 12A:
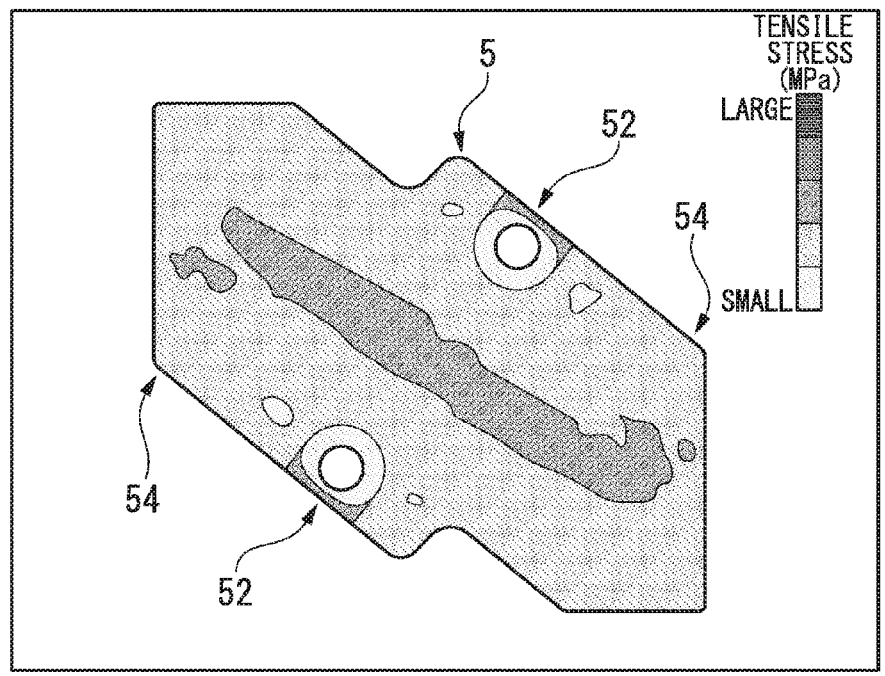
FIG. 12A is a stress analysis diagram showing a case in which the brim section of the ball circulation part according to the embodiment of the present invention is provided.
Figure 12B:
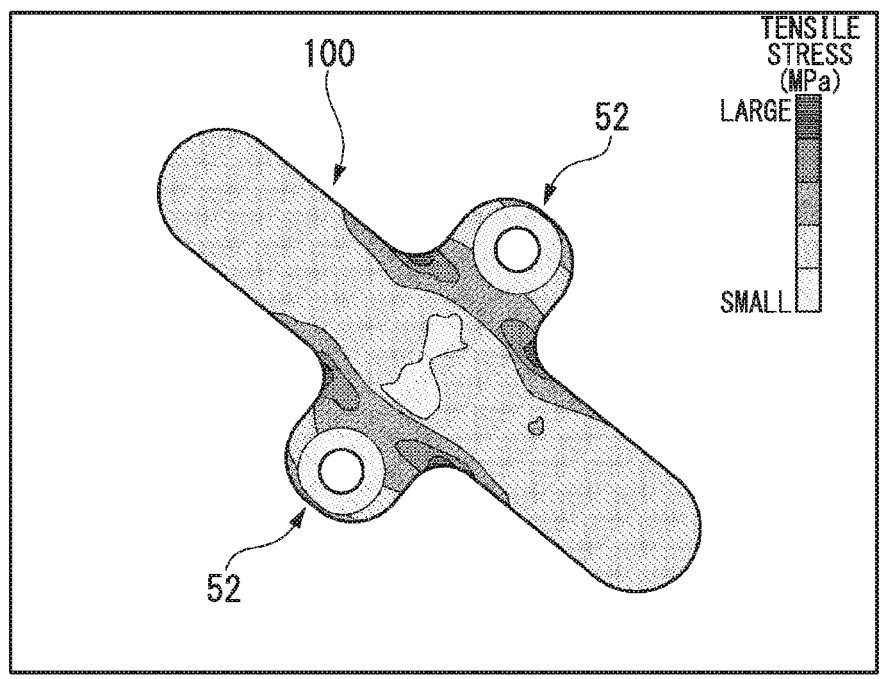
FIG. 12B is a stress analysis diagram showing a case in which the brim section of the ball circulation part according to the embodiment of the present invention is not provided.

FIGS. 12A and 12B are stress analysis diagrams for describing the action of the brim section 54 of the ball circulation part 5 according to the embodiment of the present invention. FIG. 12A shows the ball circulation part 5 of the embodiment in which the brim section 54 is provided. FIG. 12B shows a ball circulation part 100 of a comparative example in which the brim section 54 is not provided.

As shown in FIG. 12B, when the brim section 54 is not provided, stress concentration occurs in the vicinity of a base root of the fixing section 52, and a large tensile stress is applied. Meanwhile, as shown in FIG. 12A, when the brim section 54 is provided, the stress concentration is hardly generated, and generation of stress is also reduced to about half. In this way, as the brim section 54 is formed to secure the large seat surface of the ball circulation part 5, the stress concentration can be suppressed and the pull-off strength can be improved.

As described above, according to the embodiment, there is provided the ball screw device 1 including the screw shaft 2 having the spiral ball rolling groove 21, the nut member 3 having the ball load rolling groove 31 opposite to the ball rolling groove 21 and forming the ball load rolling path 6, the ball circulation part 5 having the ball circulation path 7 configured to connect one end and the other end of the ball load rolling path 6, and the balls 4 configured to endlessly circulate along the ball load rolling path 6 and the ball circulation path 7, wherein the ball circulation part 5 is formed by combining the first split body 50 and the second split body 60, the first split body 50 has the fixing section 52 fixed to the outer surface 32 of the nut member 3, and the second split body 60 has the pair of leg sections 63 configured to scoop up the balls 4 moving along the ball load rolling path 6 and return the balls 4 to the ball load rolling path 6, the connecting section 64 configured to connect the pair of leg sections 63 and disposed between the first split body 50 and the nut member 3, and the pair of shoulder sections 62 configured to face the side surfaces 53a and 53b of the first split body 50 in two directions so as to sandwich the first split body 50 therebetween. According to the configuration, the positioning restriction property with respect to the nut member 3 of the ball circulation part 5 that is able to be split can be increased.

Hereinabove, while an appropriate embodiment of the present invention has been described with reference to the accompanying drawings, the present invention is not limited to the embodiment. All shapes, combinations, or the like, of the components shown in the above-mentioned embodiment are exemplarily provided and may be variously modified based on design requirements or the like without departing from the spirit of the present invention.

For example, in the embodiment, while the case in which the shoulder sections have a flat plate shape when seen in a plan view has been exemplified, the shoulder sections may have another shape as long as the shoulder sections face the first split body in two directions. For example, the shoulder sections may have a triangular shape, a quadrangular shape, other polygonal shapes, a round shape, or an elliptical shape when seen in a plan view. In addition, the shape of the notch section may also have another shape as long as the notch section includes side surfaces opposite to the shoulder sections in two directions.

In addition, for example, in the embodiment, while the case in which the plurality of ball circulation parts are attached to the nut member to form a plurality of endless circulation paths of the balls has been described, only one ball circulation member may be attached to the nut member to form only one endless circulation path of the balls.

In addition, for example, in the embodiment, while the case in which the rolling body is the ball has been exemplified, another rolling body such as a roller or the like may be provided.

INDUSTRIAL APPLICABILITY

The above-mentioned ball screw device can increase a positioning restriction property with respect to the nut member of the rolling body circulation part that can be split.

REFERENCE SIGNS LIST

1 Ball screw device
2 Screw shaft
3 Nut member
4 Ball (rolling body)
5 Ball circulation part (rolling body circulation part)
6 Ball load rolling path (rolling body load rolling path)
7 Ball circulation path (rolling body circulation path)
21 Ball rolling groove (rolling body rolling groove)
31 Ball load rolling groove (rolling body load rolling groove)
32 Outer surface
50 First split body
52 Fixing section
53 Notch section
53a Side surface
53b Side surface
54 Brim section
60 Second split body
62 Shoulder section
63 Leg section
64 Connecting section
O Axis
X1 Region
X2 Region

The invention claimed is:
1. A ball screw device comprising:
a screw shaft having a spiral rolling body rolling groove;
a nut member having a rolling body load rolling groove opposite to the rolling body rolling groove and forming a rolling body load rolling path;
a rolling body circulation part having a rolling body circulation path configured to connect one end and the other end of the rolling body load rolling path; and
a rolling body configured to endlessly circulate along the rolling body load rolling path and the rolling body circulation path,
wherein the rolling body circulation part is formed by combining a first split body and a second split body,
the first split body has a fixing section fixed to an outer surface of the nut member, and
the second split body has a pair of leg sections configured to scoop up the rolling body moving along the rolling body load rolling path and return the rolling body to the rolling body load rolling path, a connecting section configured to connect the pair of leg sections and disposed between the first split body and the nut member, and a pair of shoulder sections facing side surfaces of the first split body in two directions so as to sandwich the first split body between the pair of shoulder sections.

2. The ball screw device according to claim 1, wherein the pair of shoulder sections are formed to protrude at opposite sides of the pair of leg sections with respect to the connecting section.

3. The ball screw device according to claim 1, wherein the two directions are a first direction in which the rolling body circulation path extends and a second direction perpendicular to the first direction.

4. The ball screw device according to claim 1, wherein the first split body has a pair of notch sections including side surfaces facing the pair of shoulder sections in the two directions.

5. The ball screw device according to claim 4, wherein the first split body has a pair of brim sections facing the outer surface in at least a portion of a region line-symmetrical with respect to a region in which the pair of notch sections are formed using the rolling body circulation path as an axis.

6. The ball screw device according to claim 2, wherein the two directions are a first direction in which the rolling body circulation path extends and a second direction perpendicular to the first direction.

7. The ball screw device according to claim 2, wherein the first split body has a pair of notch sections including side surfaces facing the pair of shoulder sections in the two directions.

8. The ball screw device according to claim 3, wherein the first split body has a pair of notch sections including side surfaces facing the pair of shoulder sections in the two directions.

9. The ball screw device according to claim 6, wherein the first split body has a pair of brim sections facing the outer surface in at least a portion of a region line-symmetrical with respect to a region in which the pair of notch sections are formed using the rolling body circulation path as an axis.

10. The ball screw device according to claim 7, wherein the first split body has a pair of brim sections facing the outer surface in at least a portion of a region line-symmetrical with respect to a region in which the pair of notch sections are formed using the rolling body circulation path as an axis.

11. The ball screw device according to claim 8, wherein the first split body has a pair of brim sections facing the outer surface in at least a portion of a region line-symmetrical with respect to a region in which the pair of notch sections are formed using the rolling body circulation path as an axis.

* * * * *